US012064973B2

(12) United States Patent
Kishikawa et al.

(10) Patent No.: US 12,064,973 B2
(45) Date of Patent: Aug. 20, 2024

(54) LIQUID CARTRIDGE AND LIQUID EJECTION APPARATUS

(71) Applicant: CANON KABUSHIKI KAISHA, Tokyo (JP)

(72) Inventors: Shinji Kishikawa, Tokyo (JP); Keisuke Kouno, Kanagawa (JP); Hiroki Hayashi, Kanagawa (JP); Tatsuo Nanjo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,537

(22) Filed: Jan. 31, 2023

(65) Prior Publication Data

US 2023/0173817 A1 Jun. 8, 2023

Related U.S. Application Data

(62) Division of application No. 17/243,351, filed on Apr. 28, 2021, now Pat. No. 11,597,210.

(30) Foreign Application Priority Data

May 22, 2020 (JP) ................................ 2020-089605

(51) Int. Cl.
*B41J 2/175* (2006.01)

(52) U.S. Cl.
CPC ....... *B41J 2/17553* (2013.01); *B41J 2/17596* (2013.01)

(58) Field of Classification Search
CPC ......................... B41J 2/17553; B41J 2/17596; B41J 2/17513; B41J 2/17523; B41J 2/17556
USPC ............................................................ 347/86
See application file for complete search history.

(56) References Cited

U.S. PATENT DOCUMENTS

| | | | | |
|---|---|---|---|---|
| 6,270,206 | B1 | 8/2001 | Shimizu et al. | 347/86 |
| 6,293,663 | B1 | 9/2001 | Koshikawa et al. | 347/86 |
| 6,325,500 | B1 | 12/2001 | Kitabatake et al. | 347/86 |
| 6,347,865 | B1 | 2/2002 | Matsumoto et al. | 347/86 |
| 6,350,025 | B1 | 2/2002 | Morita et al. | 347/86 |
| 6,382,783 | B1 | 5/2002 | Hayashi et al. | 347/85 |
| 6,390,601 | B1 | 5/2002 | Morita et al. | 347/49 |

(Continued)

FOREIGN PATENT DOCUMENTS

| | | |
|---|---|---|
| CN | 109318590 | 2/2019 |
| JP | 2018-161870 | 10/2018 |

(Continued)

OTHER PUBLICATIONS

Office Action dated Apr. 2, 2024 in counterpart Japanese Application No. 2020-089605, together with English translation thereof.

*Primary Examiner* — Jason S Uhlenhake
*Assistant Examiner* — Alexander D Shenderov
(74) *Attorney, Agent, or Firm* — Venable LLP

(57) ABSTRACT

A liquid cartridge includes: a valve unit configured to be movable to a position to close the atmosphere communication hole and a position to open the atmosphere communication hole; and a lever configured to fix the valve unit to the position to close the atmosphere communication hole by pressing the valve unit and configured to be capable of moving the valve unit to the position to open the atmosphere communication hole by removing the pressing against the valve unit, wherein the lever is configured to remove the pressing against the valve unit by moving in a direction intersecting a direction in which the valve unit moves.

12 Claims, 13 Drawing Sheets

(56) References Cited

U.S. PATENT DOCUMENTS 6,402,298 B1 6/2002 Nanjo et al. .................... 347/49
6,422,674 B1 7/2002 Hinami et al. .................... 347/7
6,443,567 B1 9/2002 Hayashi et al. ................ 347/85
6,447,084 B1 9/2002 Uetsuki et al. ................... 347/7
6,450,631 B1 9/2002 Hayashi et al. ................ 347/86
6,454,400 B1 9/2002 Morita et al. ................... 347/86
6,471,343 B1 10/2002 Shimizu et al. ................ 347/85
6,474,797 B2 11/2002 Kurata et al. ................... 347/85
6,485,136 B1 11/2002 Shimizu et al. ................ 347/86
6,505,923 B1 1/2003 Yamamoto et al. ............ 347/85
6,511,167 B1 1/2003 Kitabatake et al. ............ 347/86
6,530,654 B2 3/2003 Kitabatake et al. ............ 347/86
6,540,321 B1 4/2003 Hirano et al. .................. 347/22
6,540,342 B2 4/2003 Koshikawa et al. ............ 347/86
6,543,886 B1 4/2003 Hattori et al. .................. 347/85
6,550,898 B2 4/2003 Hayashi et al. ................ 347/85
6,598,963 B1 7/2003 Yamamoto et al. ............ 347/85
6,629,758 B2 10/2003 Okamoto et al. ............... 347/85
6,637,872 B2 10/2003 Ara et al. ........................ 347/85
6,655,542 B2 12/2003 Koshikawa et al. .......... 220/661
6,692,115 B2 2/2004 Sanada et al. .................. 347/85
6,698,871 B1 3/2004 Hayashi et al. ................ 347/86
6,702,427 B2 3/2004 Shimizu et al. ................ 347/50
6,705,715 B2 3/2004 Morita et al. ................... 347/87
6,709,092 B2 3/2004 Hayashi et al. ................ 347/86
6,712,458 B2 3/2004 Hatasa et al. ................... 347/86
6,719,415 B1 4/2004 Hattori et al. .................. 347/86
6,742,857 B2 6/2004 Koshikawa et al. ............ 347/19
6,746,110 B2 6/2004 Hayashi .......................... 347/86
6,755,500 B2 6/2004 Hirano et al. .................. 347/22
6,796,645 B2 9/2004 Hayashi et al. ................ 347/86
6,805,434 B2 10/2004 Hayashi et al. ................ 347/85
6,815,381 B1 11/2004 Yamamoto et al. .......... 442/187
6,824,258 B2 11/2004 Yamamoto et al. ............ 347/86
6,827,431 B2 12/2004 Kitabatake et al. ............ 347/86
6,851,798 B2 2/2005 Koshikawa et al. ............ 347/85
6,863,762 B2 3/2005 Sanada et al. ................ 156/180
6,877,847 B2 4/2005 Hayashi et al. ................ 347/86
6,877,848 B2 4/2005 Shimizu et al. ................ 347/86
6,921,161 B2 7/2005 Morita et al. ................... 347/86
6,942,325 B2 9/2005 Nanjo ............................ 347/86
6,942,326 B2 9/2005 Hayashi et al. ................ 347/86
6,966,631 B2 11/2005 Matsuo et al. .................. 347/49
6,971,741 B2 12/2005 Nanjo et al. .................... 347/85
6,997,548 B2 2/2006 Matsuo et al. .................. 347/86
7,077,514 B2 7/2006 Inoue et al. .................... 347/86
7,104,640 B2 9/2006 Ogura et al. .................... 347/86
7,118,194 B2 10/2006 Matsuo et al. .................. 347/49
7,134,747 B2 11/2006 Hayashi et al. ................ 347/86
7,165,829 B2 1/2007 Hayashi et al. ................ 347/49
7,207,159 B2 4/2007 Nanjo et al. .................... 53/492
7,293,865 B2 11/2007 Tsukuda et al. ................ 347/86
7,303,090 B2 12/2007 Nanjo et al. .................. 220/360
7,552,837 B2 6/2009 Nanjo et al. .................. 220/360
8,011,768 B2 9/2011 Hayashi et al. ................ 347/86
8,047,641 B2 11/2011 Nanjo et al. .................... 347/86
8,205,974 B2 6/2012 Ogura et al. .................... 347/86
8,439,491 B2 5/2013 Hayashi et al. ................ 347/86
8,485,642 B2 7/2013 Hayashi et al. ................ 347/49
8,529,037 B2 9/2013 Miyashita et al. ............. 347/86
8,770,730 B2 7/2014 Nanjo et al. .................... 347/86
8,770,731 B2 7/2014 Miyashita et al. ............. 347/86
8,960,869 B2 2/2015 Takada et al. .................. 347/86
9,016,842 B2 4/2015 Miyashita et al. ............. 347/86
9,333,758 B2 5/2016 Koshikawa et al. ... B41J 2/1752
9,375,938 B2 6/2016 Kondo et al. ........ B41J 2/17513
9,597,884 B2 3/2017 Nanjo et al. ......... B41J 2/17526
9,724,929 B2 8/2017 Yoshii et al. .......... B41J 2/1752
9,738,081 B2 8/2017 Kimura et al. .......... B41J 2/175
9,821,562 B2 11/2017 Nanjo et al. ......... B41J 2/17523
9,840,082 B2 12/2017 Nanjo et al. ......... B41J 2/17513
9,908,338 B2 3/2018 Koshikawa et al. ......................... B41J 2/17559
9,919,536 B2 3/2018 Miyashita et al. ... B41J 2/17523
9,962,945 B2 5/2018 Takaoka et al. ..... B41J 2/17523
9,981,477 B2 5/2018 Fukuchi et al. ..... B41J 2/17553
9,981,478 B2 5/2018 Ikebe et al. .............. B41J 29/02
10,029,474 B2 7/2018 Takada et al. ..... B01D 19/0073
10,118,396 B2 11/2018 Kimura et al. ........ B41J 29/377
10,160,222 B2 12/2018 Shiba et al. ......... B41J 2/17566
10,207,511 B2 2/2019 Nanjo et al. ............. B41J 2/175
10,336,087 B2 7/2019 Miyashita et al. ... B41J 2/17509
10,391,776 B2 8/2019 Hayashi et al. ..... B41J 2/17513
10,493,765 B2 12/2019 Kobayashi et al. ....... B41J 2/19
10,618,293 B2 4/2020 Koshikawa et al. ......................... G03G 15/0886
10,675,882 B2 6/2020 Shiba et al. ......... B41J 2/17566
10,836,175 B2 11/2020 Miyashita et al. ... B41J 2/17553
10,994,548 B2 5/2021 Iinuma et al. ........... B41J 2/175
2003/0038867 A1 2/2003 Yamamoto et al. ............ 347/86
2006/0238583 A1 10/2006 Petersen et al. ......... B41J 2/175
2018/0272724 A1 9/2018 Nukui et al. ............. B41J 2/175
2018/0272741 A1 9/2018 Kobayashi et al. . B41J 2/17553
2020/0180318 A1 6/2020 Kobayashi et al. ..... B41J 2/175
2021/0300052 A1 9/2021 Takei et al. .............. B41J 2/175
2021/0300055 A1 9/2021 Koshikawa et al. ..... B41J 2/175

FOREIGN PATENT DOCUMENTS

JP 2018-161872 10/2018
JP 2018-161876 10/2018

IVB CROSS-SECTION

IVD CROSS-SECTION

LIQUID CARTRIDGE AND LIQUID EJECTION APPARATUS

BACKGROUND OF THE INVENTION

This application is a division of application Ser. No. 17/243,351 filed Apr. 28, 2021, currently pending; and claims priority under 35 U.S.C. § 119 to Japan Application No. 2020-089605 filed in Japan on May 22, 2020; and the contents of all of which are incorporated herein by reference as if set forth in full.

Field of the Invention

The present invention relates to a liquid cartridge including a storage chamber in which liquid is stored and to a liquid ejection apparatus to which the liquid cartridge is attached.

Description of the Related Art

There is a liquid cartridge that stores liquid. The liquid cartridge described in Japanese Patent Laid-Open No. 2018-161876 (hereinafter referred to as Document 1) has a valve element that shuts off a liquid storage unit from the atmosphere and is configured so that, if the valve element moves, the storage chamber is thereby opened to the atmosphere.

More specifically, the liquid cartridge described in Document 1 has a lever that presses the valve element and a supporting member connected to an inner cover of the liquid cartridge to fix the lever. Further, in the state where the liquid cartridge is not mounted on an apparatus, the valve element is pressed by the lever, and the valve element closes an atmosphere communication hole that allows the liquid storage chamber to communicate with the outside. On the other hand, in the process of mounting the liquid cartridge on an apparatus, a force is applied in the direction of pivotally moving the lever by a protrusion disposed on the apparatus, so that the pressing by the lever against the valve element is removed. If the pressing by the lever is removed, the valve element is thereby moved by a spring disposed in the valve element, and the atmosphere communication hole is opened, so that the liquid storage chamber communicates with the atmosphere.

In the liquid cartridge described in Document 1, it is necessary that the supporting member supports the lever at two points for fixation, so that the supporting member having a complicated shape is required.

SUMMARY OF THE INVENTION

A liquid cartridge according to an embodiment of the present invention includes: a storage chamber configured to store liquid; a liquid supply unit configured to supply the liquid stored in the storage chamber to an outside; a first partition configured to section an inside of the storage chamber from an atmosphere; an atmosphere communication hole disposed in the first partition and configured to allow the inside of the storage chamber to communicate with the atmosphere; a valve unit configured to be movable to a position to close the atmosphere communication hole and a position to open the atmosphere communication hole; and a lever configured to fix the valve unit to the position to close the atmosphere communication hole by pressing the valve unit and configured to be capable of moving the valve unit to the position to open the atmosphere communication hole by removing the pressing against the valve unit, wherein the lever is configured to remove the pressing against the valve unit by moving in a direction intersecting a direction in which the valve unit moves.

Further features of the present invention will become apparent from the following description of exemplary embodiments with reference to the attached drawings.

DESCRIPTION OF THE EMBODIMENTS

Hereinafter, embodiments will be explained with reference to the drawings. The same sign is assigned for explanations of the same configuration. In addition, the relative positions, shapes, etc., of the constituent elements described in the embodiments are merely examples.

First Embodiment

The liquid cartridge of the present embodiment stores liquid to be supplied to a liquid ejection head included in a liquid ejection apparatus such as a recording apparatus. The liquid cartridge is configured to be detachably attachable to the liquid ejection apparatus. The liquid cartridge is shut off from the outside in the state of not being mounted on the liquid ejection apparatus, so that the liquid is prevented from leaking from the case to the outside. For example, during transportation such as distribution, it is desirable that the storage chamber of the liquid is closed so that the liquid inside does not scatter to the outside. On the other hand, in the state of being mounted on the liquid ejection apparatus, the liquid cartridge is opened to the atmosphere and is configured to promptly supply the liquid to the liquid ejection head that ejects the liquid. For example, the liquid cartridge is configured to take in the outside air for the amount of liquid consumed by ejection from the liquid ejection head, so that the liquid can be continuously supplied.

Figure 1:
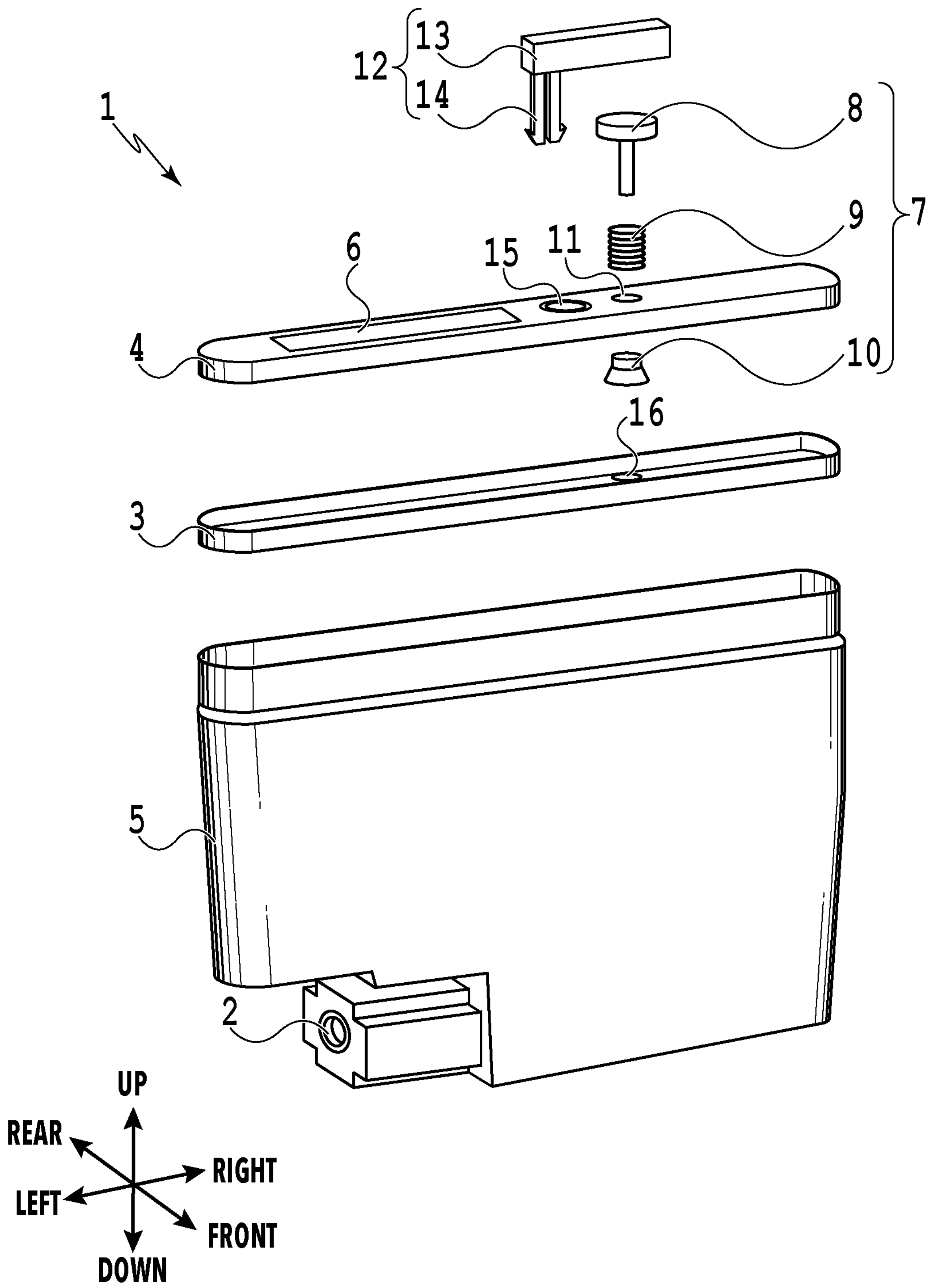
FIG. 1 is an exploded perspective diagram of a liquid cartridge.

FIG. 1 is an exploded perspective diagram of the liquid cartridge 1 of the present embodiment. The up-down direction of FIG. 1 is the up-down direction in the direction of gravity.

The liquid cartridge 1 is equipped with the case 5 including a storage chamber in which liquid ink is stored, the liquid supply unit 2 that supplies liquid to a liquid ejection head (not illustrated in the drawing), the first inner cover 3, the second inner cover 4, the valve unit 7, and the lever 12. The first inner cover 3 is arranged on the upper part of the case 5, and the second inner cover 4 is arranged on the upper part of the first inner cover 3. That is, the second inner cover 4 is arranged on the opposite side of the storage chamber in relation to the first inner cover 3.

An air path is formed with the first inner cover 3, which is the first partition, and the second inner cover 4, which is the second partition. The first inner cover 3 is a partition that sections the inside of the storage chamber from the atmosphere. The first inner cover 3 has the atmosphere communication hole 16 formed to allow the storage chamber to communicate with the air path. The second inner cover 4 has the valve unit assembling hole 11 which is an aperture through which the valve unit 7 passes, the lever assembling hole 15 which is an aperture through which the lever 12 passes, and the aperture 6 through which the atmosphere passes.

The valve unit 7 has the spring holder unit 8, the coil spring 9, and the sealing unit 10. The spring holder unit 8 is fitted in the coil spring 9 and inserted from above into the valve unit assembling hole 11, which is formed in the second inner cover 4. That is, the coil spring 9 is arranged on the upper side the second inner cover 4. With the inserted spring holder unit 8 and the sealing unit 10, the valve unit 7 is configured to sandwich the second inner cover 4. The sealing unit 10 has a stepped structure with at least two sizes of outer diameters. In the present example, the first step section having an outer diameter of the first size and the second step section having a tapered shape in which the outer diameter gradually decreases toward the first step section are included. The outer diameter of the first size is smaller than the valve unit assembling hole 11. The outer diameter of the second size, which is largest size in the second step section, is larger than the valve unit assembling hole 11. Further, the outer diameter of the second size is larger than that of the atmosphere communication hole 16.

The lever 12 has the valve unit pressing unit 13 and the supporting unit 14. The lever 12 is held by the second inner cover 4 by inserting the supporting unit 14 into the lever assembling hole 15, which is formed in the second inner cover 4. As a method of holding the supporting unit 14 in the second inner cover 4, a snap-fit system can be used, for example. The lever 12 is held by the second inner cover 4, and the valve unit pressing unit 13 can be pivotally moved about a central axis corresponding to the longitudinal direction (up-down direction of the drawing) of the supporting unit 14. Further, in a case where the supporting unit 14 is inserted into and held by the second inner cover 4, the valve unit pressing unit 13 presses the valve unit 7. If the valve unit 7 is pressed by this valve unit pressing unit 13, the sealing unit 10 of the valve unit 7 closes the atmosphere communication hole 16, which is formed in the first inner cover 3. That is, the valve unit 7 is biased by the coil spring 9 in the direction of opening the atmosphere communication hole 16, and, if the lever 12 presses the valve unit 7 against this bias, the atmosphere communication hole 16 is thereby closed. If the atmosphere communication hole 16 is closed, the liquid stored in the case 5 is thereby turned into a state of being prevented from leaking to the outside. That is, in the state before the liquid cartridge 1 is mounted on the liquid ejection apparatus, the storage chamber inside the case 5 is configured to be shut off from the outside.

Figure 2A:
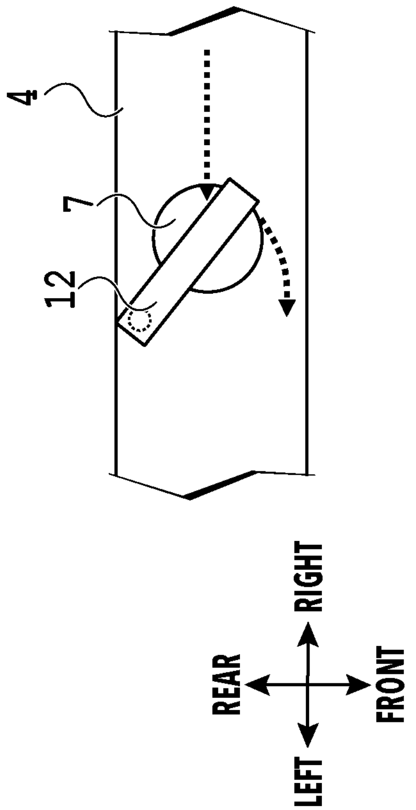
FIG. 2A through FIG. 2D are diagrams illustrating a peripheral section of a valve unit.
Figure 2B:
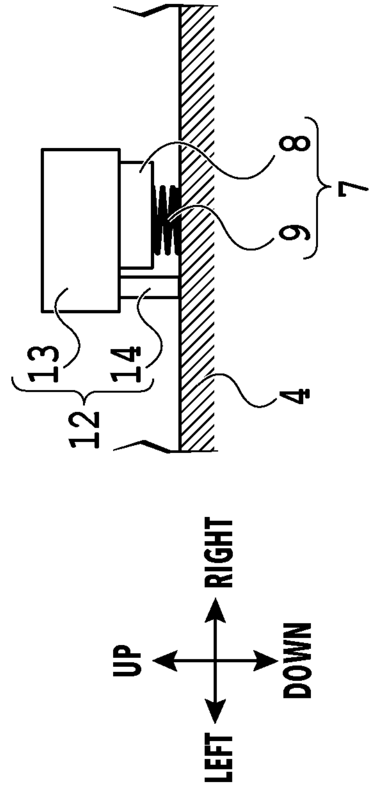

FIG. 2A through FIG. 2D are diagrams illustrating the peripheral section of the valve unit 7 in a case where the liquid cartridge 1 in the first embodiment is viewed from the upper surface and a side surface. FIG. 2A is a diagram in which the state of the first position, which is before the lever 12 is moved, is viewed from the upper surface, and FIG. 2B is a diagram in which the state of the first position, which is before the lever 12 is moved, is viewed from a side surface (front surface).

The spring holder unit 8 and coil spring 9 of the valve unit 7 are pressed by the valve unit pressing unit 13 of the lever 12. Accordingly, as explained with reference to FIG. 1, the sealing unit 10 of the valve unit 7 is in the state of closing the atmosphere communication hole 16 of the first inner cover 3 (not illustrated in FIG. 2A through FIG. 2D).

Figure 2C:
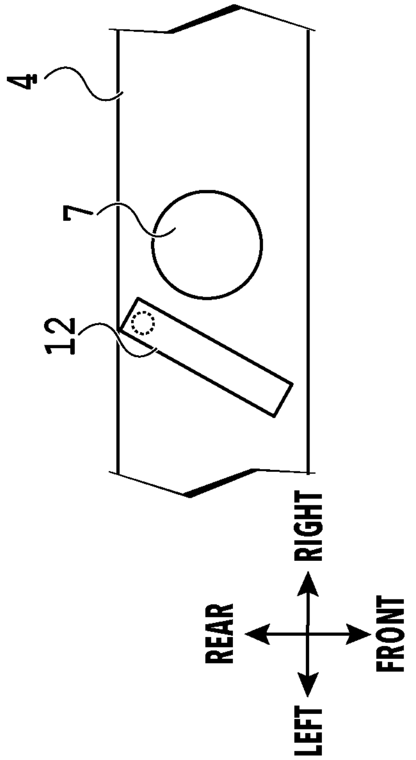
Figure 2D:
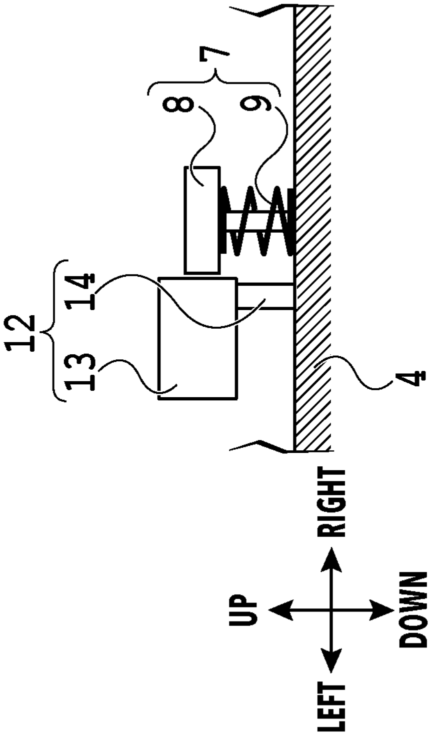

FIG. 2C is a diagram in which the state of the second position, which is after the lever 12 is moved, is viewed from the upper surface, and FIG. 2D is a diagram in which the state of the second position, which is after the lever 12 is moved, is viewed from the side surface (front surface). If a force is applied to the lever 12 in a direction intersecting the direction (up-down direction) in which the valve unit 7 moves, the lever 12 pivotally moves in the direction of the applied force with the supporting unit 14 being a fulcrum (see the arrows in FIG. 2A). If the lever 12 pivotally moves, the valve unit 7 is released from the state of being pressed by the lever 12, as illustrated in FIG. 2C. Then, the spring holder unit 8 of the valve unit 7, which has been pressed, moves upward due to the bias caused by the coil spring 9, so that the sealing unit 10 is separated from the atmosphere communication hole 16. Accordingly, the storage chamber inside the case 5 is opened to the atmosphere, so that the liquid can be supplied to the liquid ejection head. As described above, the valve unit 7 is configured to be movable to a position where the atmosphere communication hole 16 is closed and to a position where the atmosphere communication hole 16 is opened.

The moved valve unit 7 does not return to its original position (position in FIG. 2B) due to the bias caused by the coil spring 9. Therefore, once the valve unit 7 moves, it is possible to maintain the storage chamber inside the case 5 in a state of being continuously opened to the atmosphere. In the examples of FIG. 2A through FIG. 2D, in the direction of the action received from the outside (direction in which the force is applied), the fulcrum in the supporting unit 14 is on the downstream side (left side in the drawings) relative to the point of effort in the valve unit pressing unit 13 to which the force is applied.

The liquid cartridge 1 is mounted on a mounting unit of the liquid ejection apparatus. The mounting unit is equipped with a guide member such as a protrusion member, for example. In the examples of FIG. 2A through FIG. 2D, it is assumed that the mounting unit is on the right side of the liquid cartridge 1. That is, the liquid cartridge 1 is to be mounted on the mounting unit by moving to the right side of FIG. 2A through FIG. 2D. Here, in a case where the liquid cartridge 1 is mounted on the mounting unit, the lever 12 abuts on the guide member, and then, in a case where the liquid cartridge 1 is further pushed in to be mounted, the lever 12 is pivotally moved by the force from the guide member, so that the atmosphere is released.

As described above, in the present embodiment, the lever 12 and the second inner cover 4 are configured so that the movement direction of the lever 12, which presses the valve unit 7 that functions as an atmosphere release valve, is a direction intersecting the direction (up-down direction) in which the valve unit 7 moves. Specifically, the lever 12 is configured to pivotally move in a direction intersecting the direction in which the valve unit 7 moves. Accordingly, the lever 12 and the second inner cover 4 (base to which the lever 12 is fixed) can be fixed at one point. Therefore, the atmosphere releasing function can be realized with a simplified configuration without using a supporting member having such a complicated shape that a lever is supported at two points.

Second Embodiment

The second embodiment basically has the same configuration as the liquid cartridge 1 of the first embodiment, but the example in which the installation position of the lever assembling hole 15 relative to the valve unit assembling hole 11 of the second inner cover 4 is different will be explained. Specifically, an explanation will be given of the example in which, in the direction in which the force is applied, the fulcrum position in the supporting unit 14 of the lever 12 is on the upstream side of the point of effort in the valve unit pressing unit 13 to which the force is applied. Hereinafter, the aspects different from the first embodiment will be mainly explained.

Figure 3A:
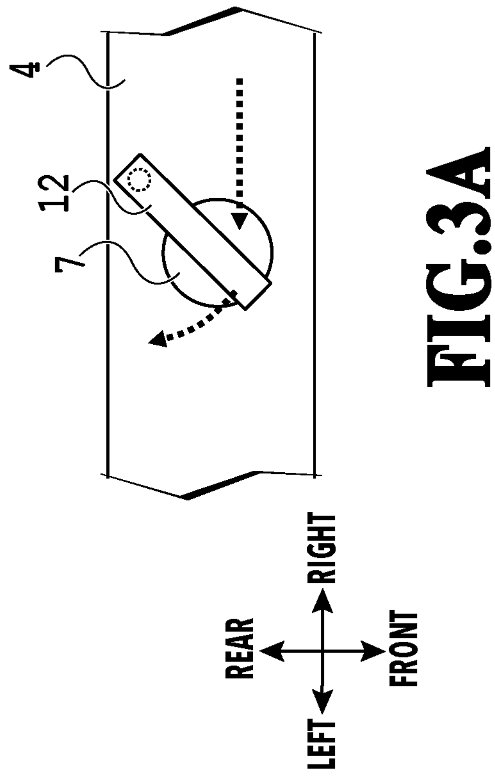
FIG. 3A through FIG. 3D are diagrams illustrating a peripheral section of a valve unit.
Figure 3B:
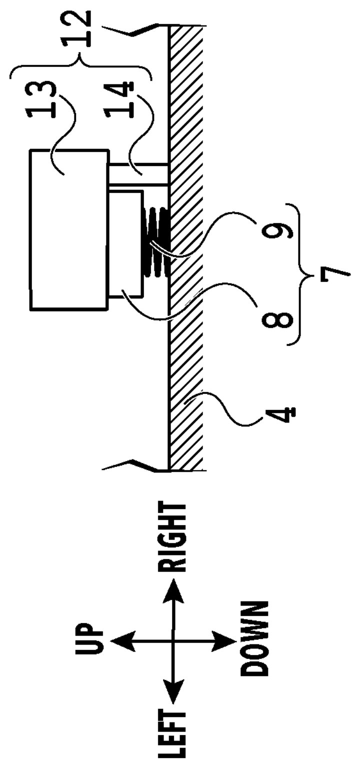

FIG. 3A through FIG. 3D are diagrams illustrating the peripheral section of the valve unit 7 in a case where the liquid cartridge 1 in the second embodiment is viewed from the upper surface and a side surface. FIG. 3A is a diagram in which the state before the lever is moved is viewed from the upper surface, and FIG. 3B is a diagram in which the state before the lever is moved is viewed from a side surface (front surface).

The spring holder unit 8 and coil spring 9 of the valve unit 7 are pressed by the valve unit pressing unit 13 of the lever 12. Accordingly, as explained with reference to FIG. 1, the sealing unit 10 of the valve unit 7 is in the state of closing the atmosphere communication hole 16 of the first inner cover 3.

Figure 3C:
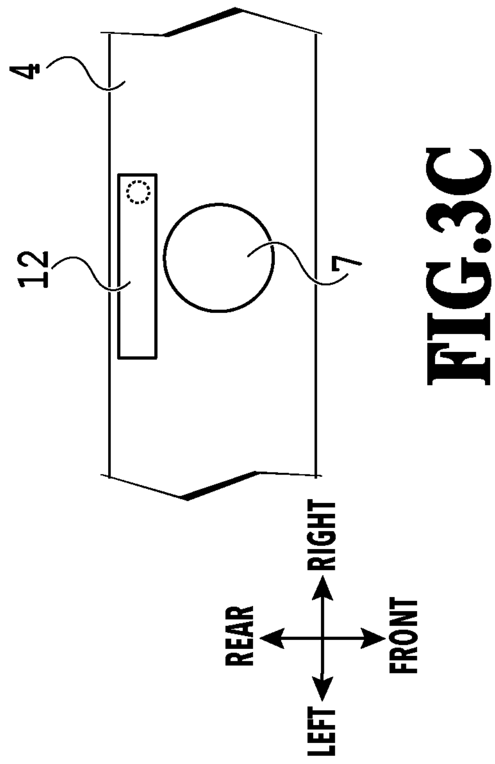
Figure 3D:
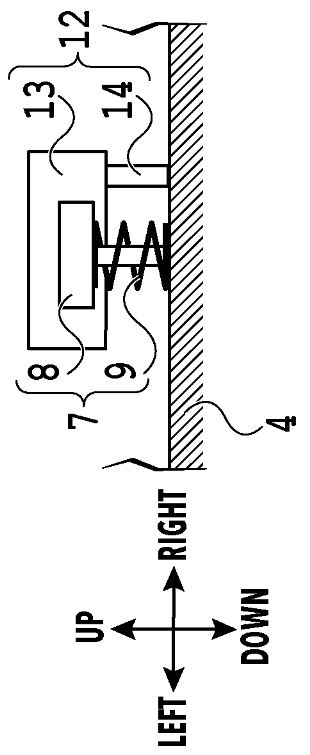

FIG. 3C is a diagram in which the state after the lever is moved is viewed from the upper surface, and FIG. 3D is a diagram in which the state after the lever is moved is viewed from the side surface (front surface). If a force is applied to the lever 12 in a direction intersecting the direction (up-down direction) in which the valve unit 7 moves, the lever 12 pivotally moves in the direction of the applied force with the supporting unit 14 being a fulcrum (see the arrows in FIG. 3A). If the lever 12 pivotally moves, the valve unit 7 is released from the state of being pressed by the lever 12, as illustrated in FIG. 3C. Then, the spring holder unit 8 of the valve unit 7, which has been pressed, moves upward due to the bias caused by the coil spring 9, so that the sealing unit 10 is separated from the atmosphere communication hole 16. Accordingly, the storage chamber inside the case 5 is opened to the atmosphere, so that the liquid can be supplied to the liquid ejection head. The moved valve unit 7 does not return to its original position (position in FIG. 3B) due to the bias caused by the coil spring 9. Therefore, once the valve unit 7 moves, it is possible to maintain the storage chamber inside the case 5 in a state of being continuously opened to the atmosphere. In the examples of FIG. 3A through FIG. 3D, in the direction of the action received from the outside (direction in which the force is applied), the fulcrum in the supporting unit 14 is on the upstream side (right side in the drawings) of the point of effort in the valve unit pressing unit 13 to which the force is applied. In the present embodiment, the state in which the liquid cartridge 1 is mounted on the mounting unit of the liquid ejection apparatus is illustrated in FIG. 3C. That is, after being mounted, the longitudinal direction of the second inner cover 4 of the liquid cartridge 1 and the longitudinal direction of the lever 12 are parallel to each other. Therefore, it is also possible to simplify the configuration of the guide member, etc., in the mounting unit on the apparatus side.

As explained above, also in the present embodiment, the atmosphere releasing function can be realized with a simplified configuration.

Third Embodiment

The third embodiment basically has the same configuration as the liquid cartridge 1 of the first embodiment, but the shape of the valve unit pressing unit 13 of the lever 12 is different. Hereinafter, the aspects different from the first embodiment will be mainly explained.

Figure 4A:
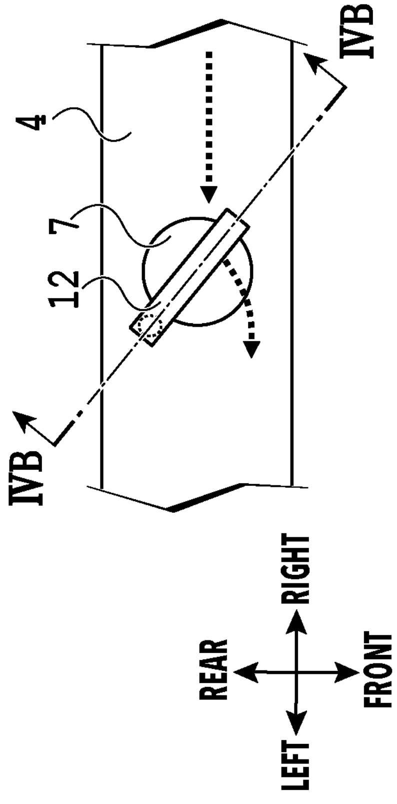
FIG. 4A through FIG. 4D are diagrams illustrating a peripheral section of a valve unit.
Figure 4B:
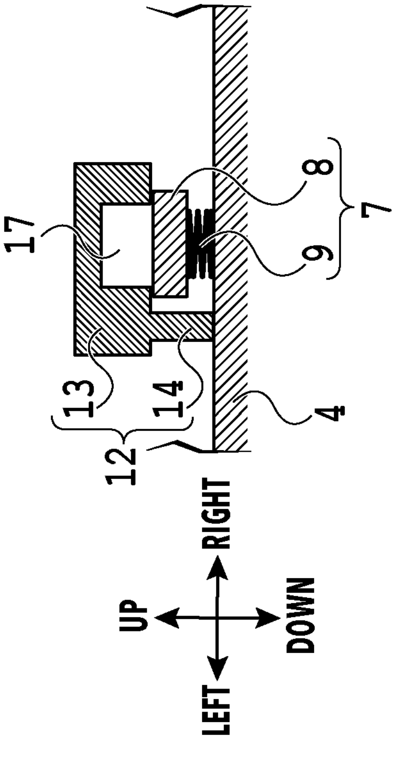

FIG. 4A through FIG. 4D are diagrams illustrating the peripheral section of the valve unit 7 in a case where the liquid cartridge in the third embodiment is viewed from the upper surface and a side surface. FIG. 4A is a diagram in which the state before the lever is moved is viewed from the upper surface, and FIG. 4B is a diagram in which the state before the lever is moved is viewed from a side surface (front surface). The cut-off portion 17 is formed in the valve unit pressing unit 13 of the lever 12. The valve unit pressing unit 13 of the lever 12 presses the valve unit 7, but the cut-off portion 17 formed in the valve unit pressing unit 13 does not press the valve unit 7.

Figure 4C:
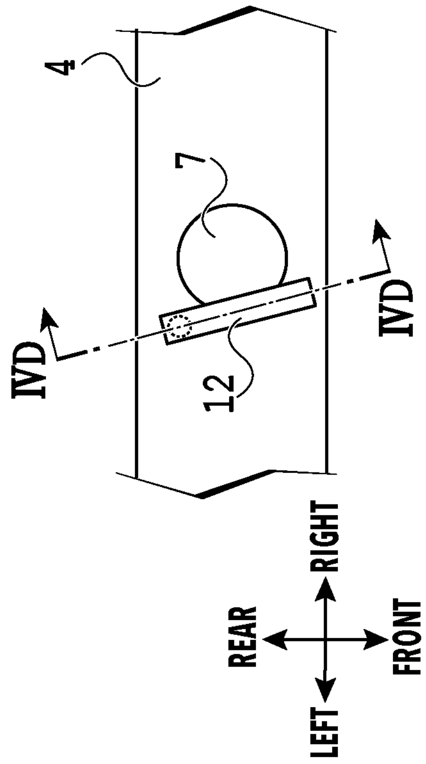
Figure 4D:
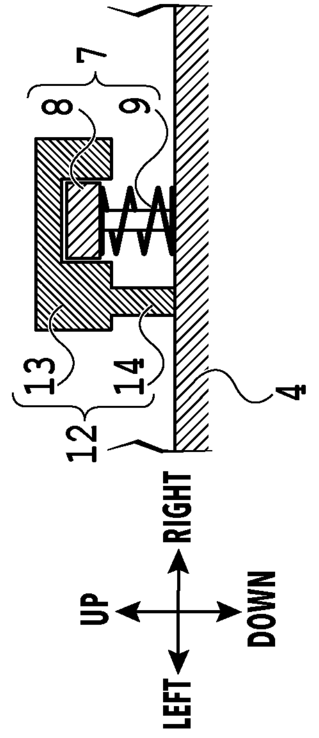

FIG. 4C is a diagram in which the state after the lever is moved is viewed from the upper surface, and FIG. 4D is a diagram in which the state after the lever is moved is viewed from the side surface (front surface). If a force is applied to the lever 12 in a direction intersecting the direction in which the valve unit 7 moves, the lever 12 pivotally moves in the direction of the applied force with the supporting unit 14 being a fulcrum (see the arrows in FIG. 4A). As illustrated in FIG. 4D, in a case where the lever 12 pivotally moves, the valve unit 7 fits inside the cut-off portion 17 of the valve unit pressing unit 13. That is, the valve unit 7 is partially released from the state of being pressed by the lever 12. Then, the spring holder unit 8 of the valve unit 7, which has been pressed, moves upward due to the bias caused by the coil spring 9, so that the sealing unit 10 is separated from the atmosphere communication hole 16. Accordingly, the storage chamber inside the case 5 is opened to the atmosphere, so that the liquid can be supplied to the liquid ejection head. The moved valve unit 7 does not return to its original position (position in FIG. 4B) due to the bias caused by the coil spring 9. Therefore, once the valve unit 7 moves, it is possible to maintain the storage chamber inside the case 5 in a state of being continuously opened to the atmosphere. In the examples of FIG. 4A through FIG. 4D, in the direction in which the force is applied, the fulcrum in the supporting unit 14 is on the downstream side (left side in the drawings) of the point of effort in the valve unit pressing unit 13 to which the force is applied.

As explained above, also in the present embodiment, the atmosphere releasing function can be realized with a simplified configuration Further, since the valve unit pressing unit 13 has the cut-off portion 17, the moving amount of the lever 12 in the pivotal movement can be reduced as compared with the first embodiment.

Fourth Embodiment

The fourth embodiment basically has the same configuration as the liquid cartridge 1 of the first embodiment, but an explanation will be given of the example in which the shape of the valve unit pressing unit 13 of the lever 12 is different. Further, the example in which the position of the lever assembling hole 15 relative to the valve unit assembling hole 11 of the second inner cover 4 is different will be explained. Specifically, an explanation will be given of the example in which, in the direction in which the force is applied, the fulcrum position in the supporting unit 14 of the lever 12 is on the upstream side of the point of effort in the valve unit pressing unit 13 to which the force is applied. Hereinafter, the aspects different from the first embodiment will be mainly explained.

Figures 5A, 5B, 5C, 5D:
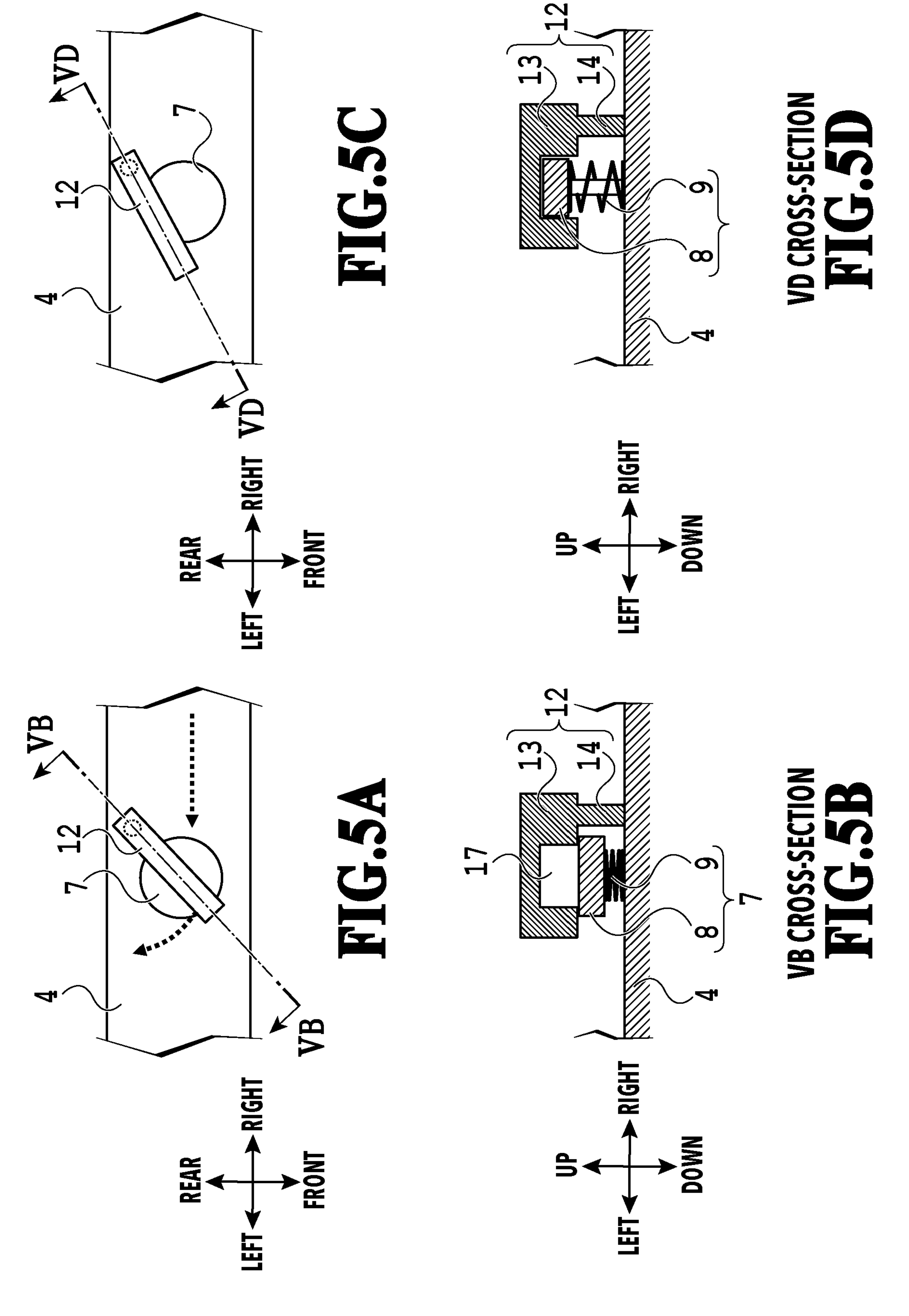
FIG. 5A through FIG. 5D are diagrams illustrating a peripheral section of a valve unit.

FIG. 5A through FIG. 5D are diagrams illustrating the peripheral section of the valve unit 7 in a case where the liquid cartridge 1 in the fourth embodiment is viewed from the upper surface and a side surface. FIG. 5A is a diagram in which the state before the lever is moved is viewed from the upper surface, and FIG. 5B is a diagram in which the state before the lever is moved is viewed from a side surface (front surface). The cut-off portion 17 is formed in the valve unit pressing unit 13 of the lever 12. The valve unit pressing unit 13 of the lever 12 presses the valve unit 7, but the cut-off portion 17 formed in the valve unit pressing unit 13 does not press the valve unit 7.

FIG. 5C is a diagram in which the state after the lever is moved is viewed from the upper surface, and FIG. 5D is a diagram in which the state after the lever is moved is viewed from the side surface (front surface). If a force is applied to the lever 12 in a direction intersecting the direction in which the valve unit 7 moves, the lever 12 pivotally moves in the direction of the applied force with the supporting unit 14 being a fulcrum (see the arrows in FIG. 5A). As illustrated in FIG. 5D, in a case where the lever 12 pivotally moves, the valve unit 7 fits inside the cut-off portion 17 of the valve unit pressing unit 13. That is, the valve unit 7 is partially released from the state of being pressed by the lever 12. Then, the spring holder unit 8 of the valve unit 7, which has been pressed, moves upward due to the bias caused by the coil spring 9, so that the sealing unit 10 is separated from the atmosphere communication hole 16. Accordingly, the storage chamber inside the case 5 is opened to the atmosphere, so that the liquid can be supplied to the liquid ejection head. The moved valve unit 7 does not return to its original position (position in FIG. 5B) due to the bias caused by the coil spring 9. Therefore, once the valve unit 7 moves, it is possible to maintain the storage chamber inside the case 5 in a state of being continuously opened to the atmosphere. In the examples of FIG. 5A through FIG. 5D, in the direction in which the force is applied, the fulcrum in the supporting unit 14 is on the upstream side (right side in the drawings) of the point of effort in the valve unit pressing unit 13 to which the force is applied.

As explained above, also in the present embodiment, the atmosphere releasing function can be realized with a simplified configuration Further, since the valve unit pressing unit 13 has the cut-off portion 17, the moving amount of the lever 12 in the pivotal movement can be reduced as compared with the second embodiment.

Fifth Embodiment

In the first to fourth embodiments, the explanations have been given of the examples in which the lever pivotally moves in a direction intersecting the direction in which the valve unit moves, so that the valve unit that functions as an atmosphere release valve thereby opens the atmosphere communication hole, and the storage chamber inside the liquid cartridge is opened to the atmosphere. In the present embodiment, another example in which the storage chamber inside the liquid cartridge is opened to the atmosphere will be explained. Further, in the present embodiment, the example in which the atmosphere communication hole will be closed in a case where the liquid cartridge is detached after being mounted on the liquid ejection apparatus will be explained.

<Overview>

Figure 6:
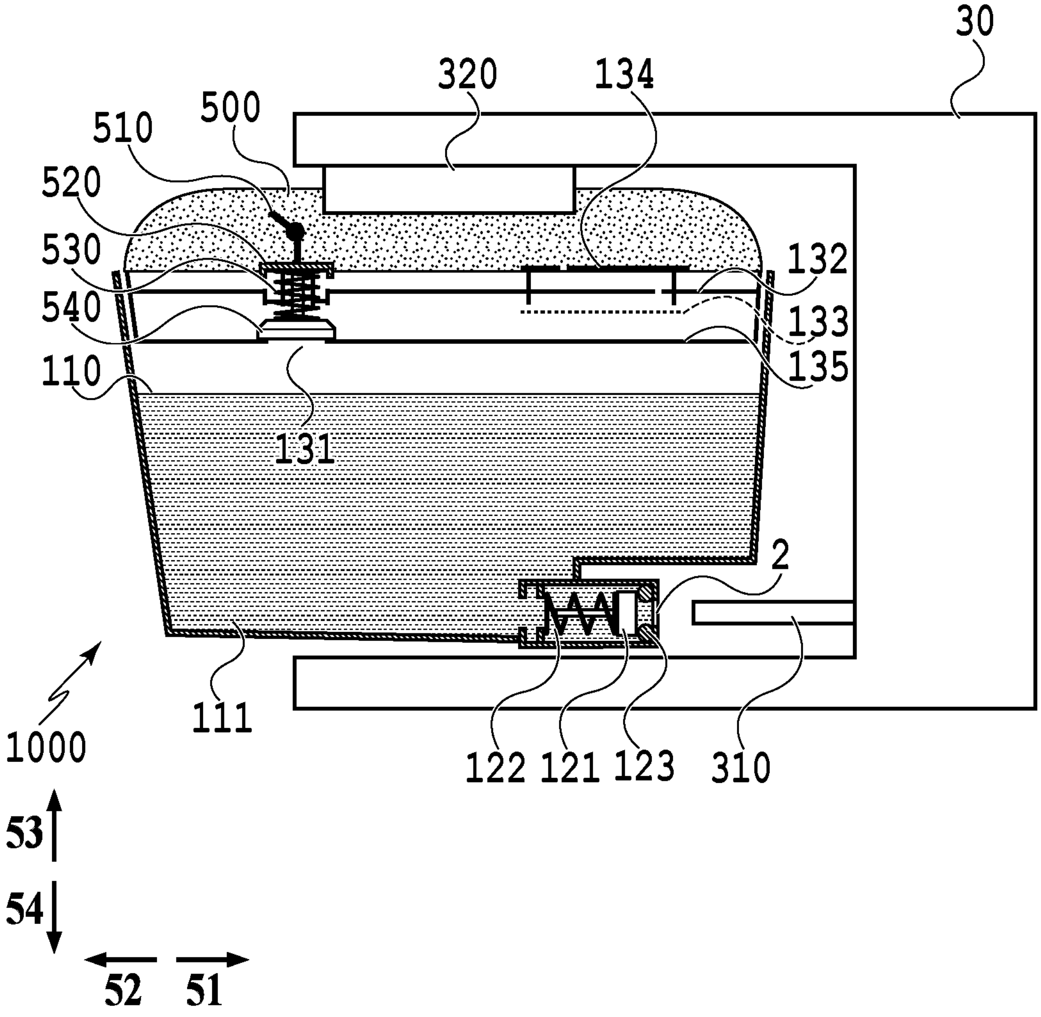
FIG. 6 is a schematic diagram illustrating a configuration of a comparative example.
Figure 7:
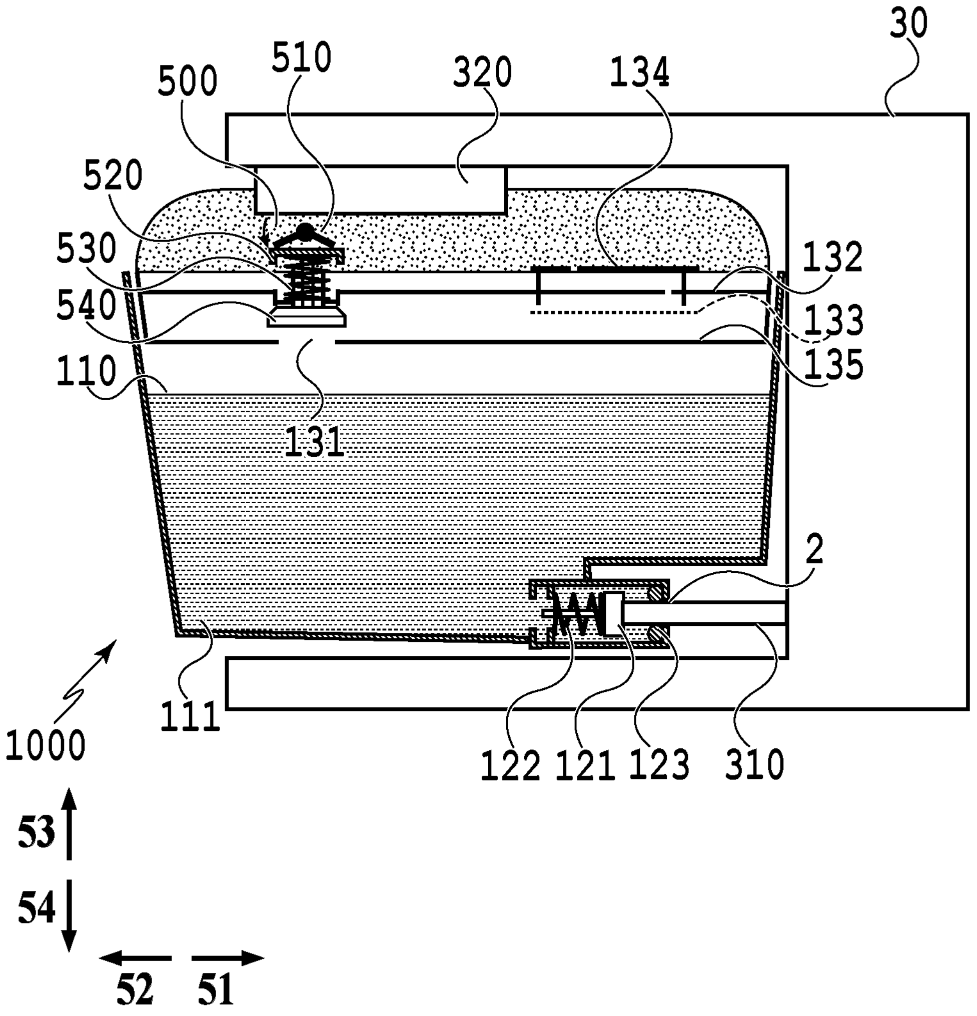
FIG. 7 is a schematic diagram illustrating the configuration of the comparative example.

FIG. 6 and FIG. 7 are schematic diagrams illustrating the configuration of the valve unit of Document 1 as a comparative example. Hereinafter, further consideration of the valve unit of Document 1 will be explained. Then, based on the consideration, the configuration of the present embodiment will be explained.

FIG. 6 is a cross-sectional diagram including the liquid cartridge 1000 in a state where the atmosphere communication hole 131 is closed and the holder 30 of the liquid ejection apparatus. FIG. 7 is a cross-sectional diagram including the liquid cartridge 1000 in a state where the atmosphere communication hole 131 is opened and the holder 30 of the liquid ejection apparatus.

In the state before being mounted on the main body of the liquid ejection apparatus, the valve element 520 which is equipped with the sealing member 540 is biased by the coil spring 530 in a direction (direction 53) to open the atmosphere communication hole 131. Further, the lever 500 presses the valve element 520 against this bias, so that the atmosphere communication hole 131 is closed. In FIG. 6, the appearance in which the valve element 520 is pressed by the lever 500 is illustrated. In the process where the liquid cartridge 1000 moves in the direction 51 to be mounted on the main body of the liquid ejection apparatus, the lever 500 is knocked down by the pressing unit 320, which is included in the holder 30 of the main body of the liquid ejection apparatus. Then, as illustrated in FIG. 7, the valve element 520 moves in the direction 53 due to the bias caused by the coil spring 530, so that the second inner cover 132 (upper cover) is thereby sealed by the sealing member 540, and, further, the atmosphere communication hole 131 is opened so as to be switched to the atmosphere released state. The atmosphere communication hole 131 communicates with the atmosphere through the air path configured with the second inner cover 132 and the first inner cover 135 (middle cover) and the atmosphere communication film 134.

In such a configuration of Document 1, if the user detaches the liquid cartridge 1000 from the main body of the liquid ejection apparatus during use, the valve element 520 has been moved to the atmosphere released position. That is, in a case where the liquid cartridge 1000 is detached from the main body of the liquid ejection apparatus, the valve element 520 maintains the atmosphere released state. This is because the liquid cartridge 1000 is pulled out from the main body of the liquid ejection apparatus in the state where the lever 500 has been pivotally moved and the sealing member 540 has been separated from the atmosphere communication hole 131 due to the bias caused by the coil spring 530. Therefore, for example, in a case where the user changes the posture of the detached liquid cartridge 1000 in order to visually check the remaining amount of liquid, there is a possibility that the liquid leaks from the gas-liquid separation membrane 133, the atmosphere communication film 134, and the liquid supply unit 2. Further, the valve element 520 that closes the atmosphere communication hole 131 is in such a positional relationship that the atmosphere communication hole 131 is closed such that the atmosphere communication hole 131 is covered from above the first inner cover 135. Therefore, during distribution of the liquid cartridge 1000, if a force for moving the valve element 520 to the opened position (force in the direction 53) acts due to an increase in the internal pressure of the storage chamber, there is a possibility that the storage chamber is opened to the atmosphere. If the storage chamber is opened to the atmosphere, there is a possibility that the liquid leaks from the gas-liquid separation membrane 133, the atmosphere communication film 134, and the liquid supply unit 2.

Regarding the liquid cartridge (liquid container) of the present embodiment, the atmosphere communication hole is closed in the state before use, such as during distribution, and is switched to the atmosphere released state by mounting the liquid cartridge on the main body of the liquid ejection apparatus at the time of use. Further, after the liquid cartridge is detached from the liquid ejection apparatus, the state is switched to the closed state again. The configuration of the liquid cartridge capable of thereby maintaining the sealed state even though the liquid cartridge is taken out and carried around during use will be explained.

<Liquid Supply System>

Figure 8:
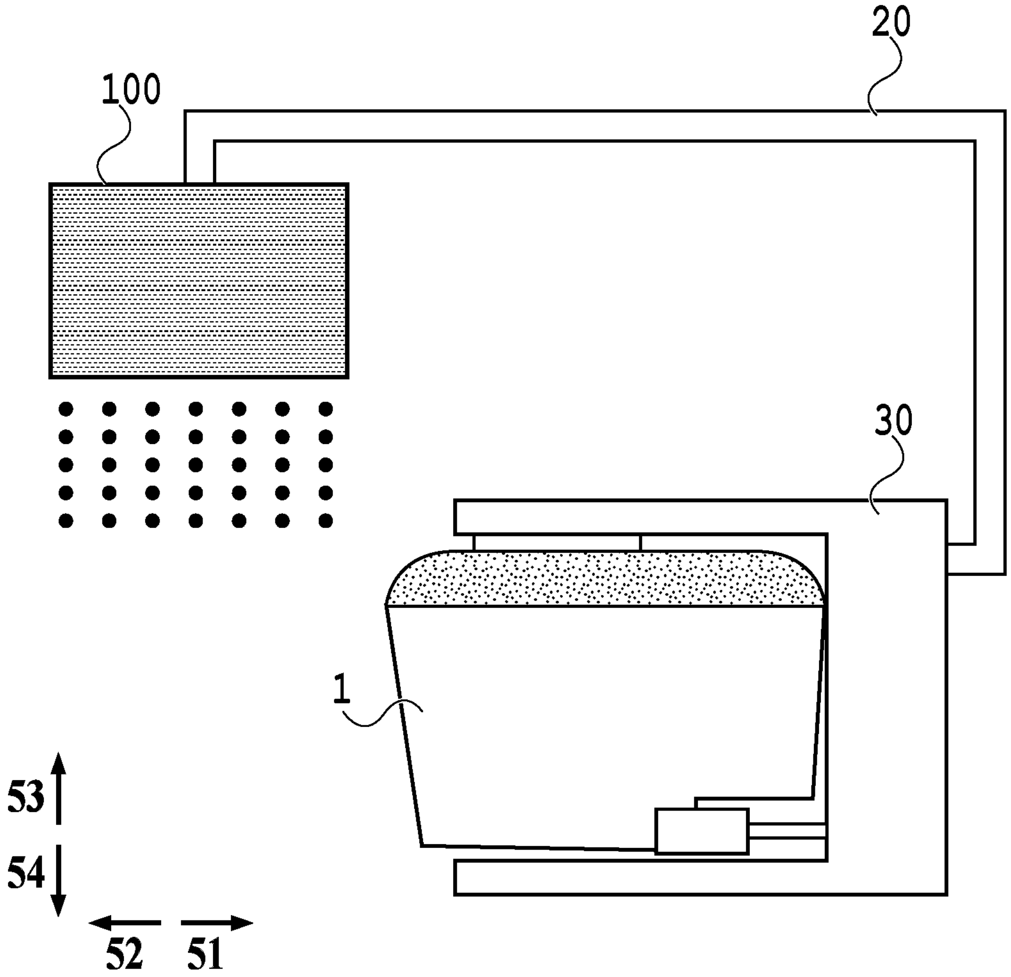
FIG. 8 is a schematic diagram of a liquid supply system.

FIG. 8 is a schematic diagram illustrating the liquid supply system of the present embodiment. The liquid ejection head 100 is an off-carriage type in a serial recording system and is mounted on the holder 30 included in the liquid ejection apparatus so as to communicate with the liquid ejection head 100 on the carriage (not illustrated in the drawing) via the tube 20. The liquid to be consumed by ejection from the liquid ejection head 100 is supplied from the liquid cartridge 1 to the liquid ejection head 100 via the tube 20.

<Liquid Cartridge>

Figure 9:
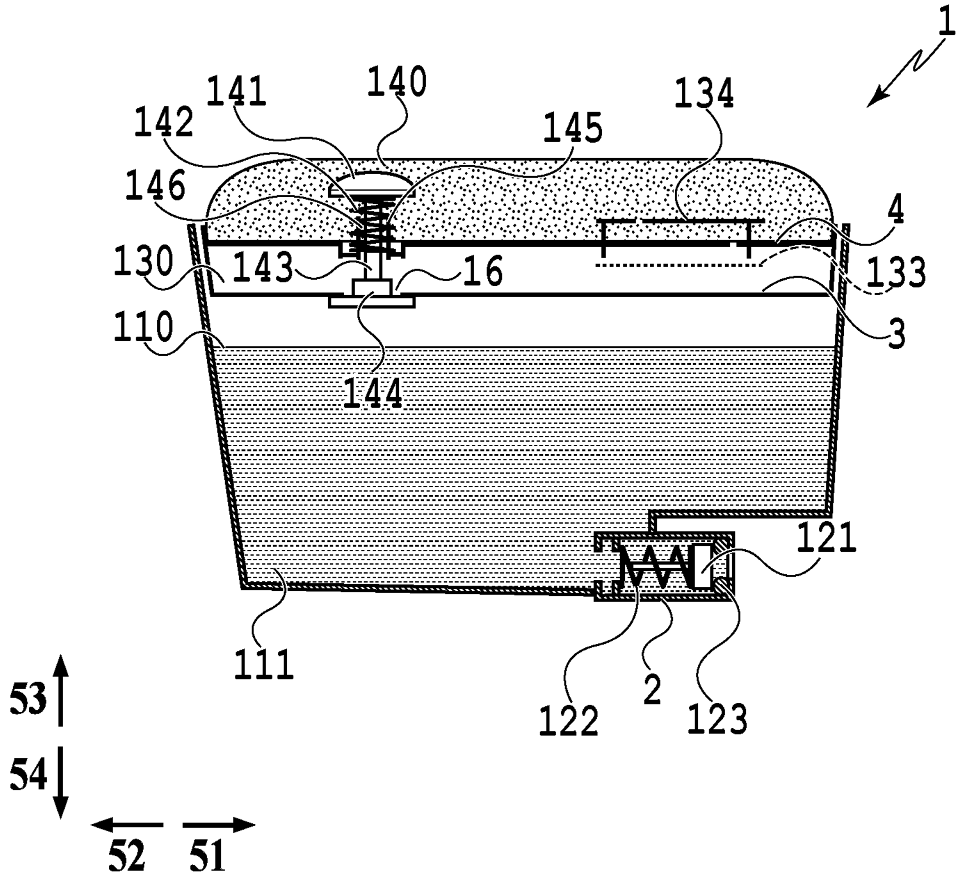
FIG. 9 is a cross-sectional diagram of a liquid cartridge before being mounting on a main body.

FIG. 9 is a cross-sectional diagram illustrating the liquid cartridge 1 before being mounted on the main body. The liquid cartridge 1 is roughly divided into the liquid storage chamber 110, the liquid supply unit 2, and the atmosphere communication unit 130. The liquid supplied to the liquid ejection head 100 is held in the liquid storage chamber 110 and is supplied via the liquid supply unit 2. If the liquid in the liquid storage chamber 110 is supplied to the liquid ejection head 100, external air is taken into the liquid storage chamber 110 via the atmosphere communication unit 130. The liquid cartridge 1 has the valve unit 140. Hereinafter, a detail explanation will be given of each part of the liquid cartridge 1 of the present embodiment.

<Liquid Storage Unit>

The liquid storage chamber 110 holds the liquid to be supplied to the liquid ejection head 100. The bottom section of the liquid storage chamber 110 has the recess 111 that is lowered by one step downward in the direction of gravity (direction 54). The liquid supply unit 2 is arranged in the recess 111. The bottom face of the recess 111 is configured to be downwardly inclined toward the liquid supply unit 2 so as to improve consumption of the liquid.

<Liquid Supply Unit>

Figure 10:
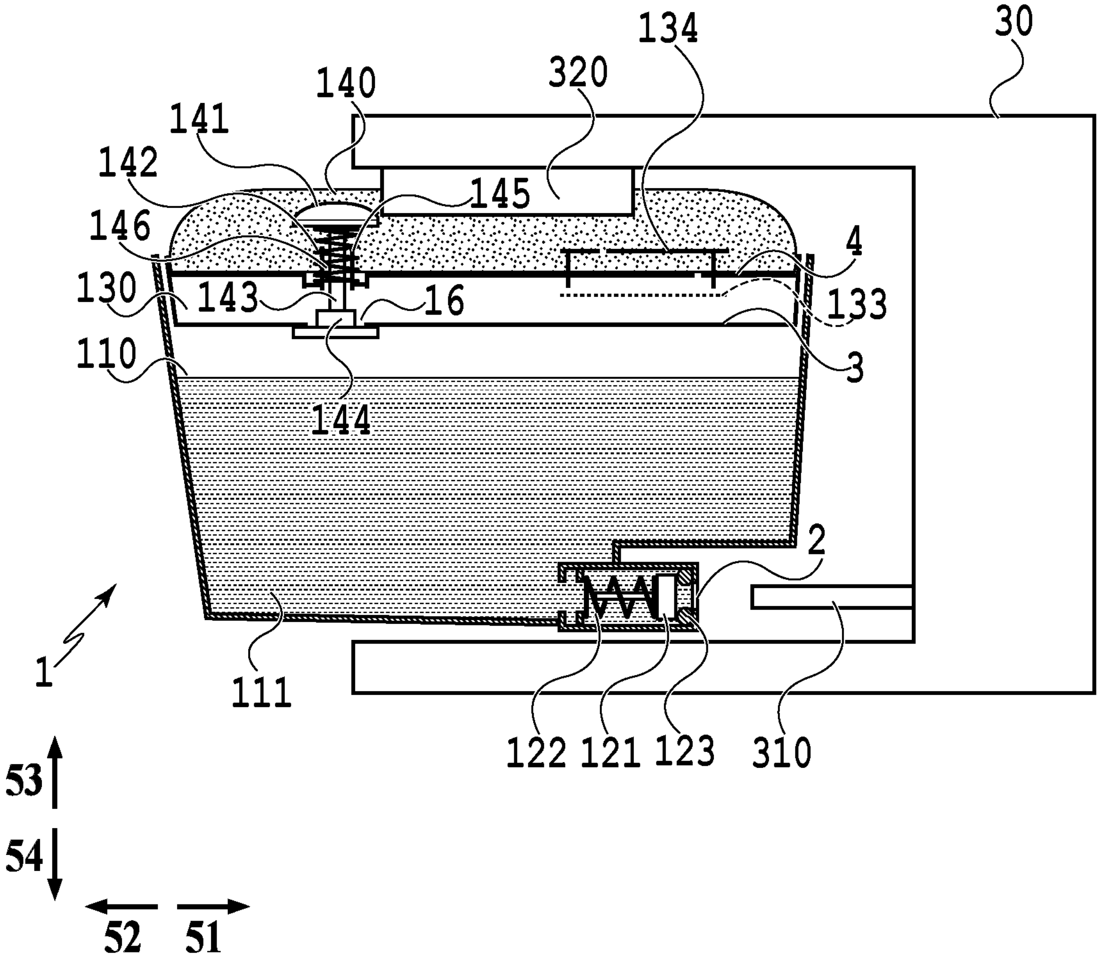
FIG. 10 is a cross-sectional diagram of the liquid cartridge immediately before being mounting on the main body.
Figure 11:
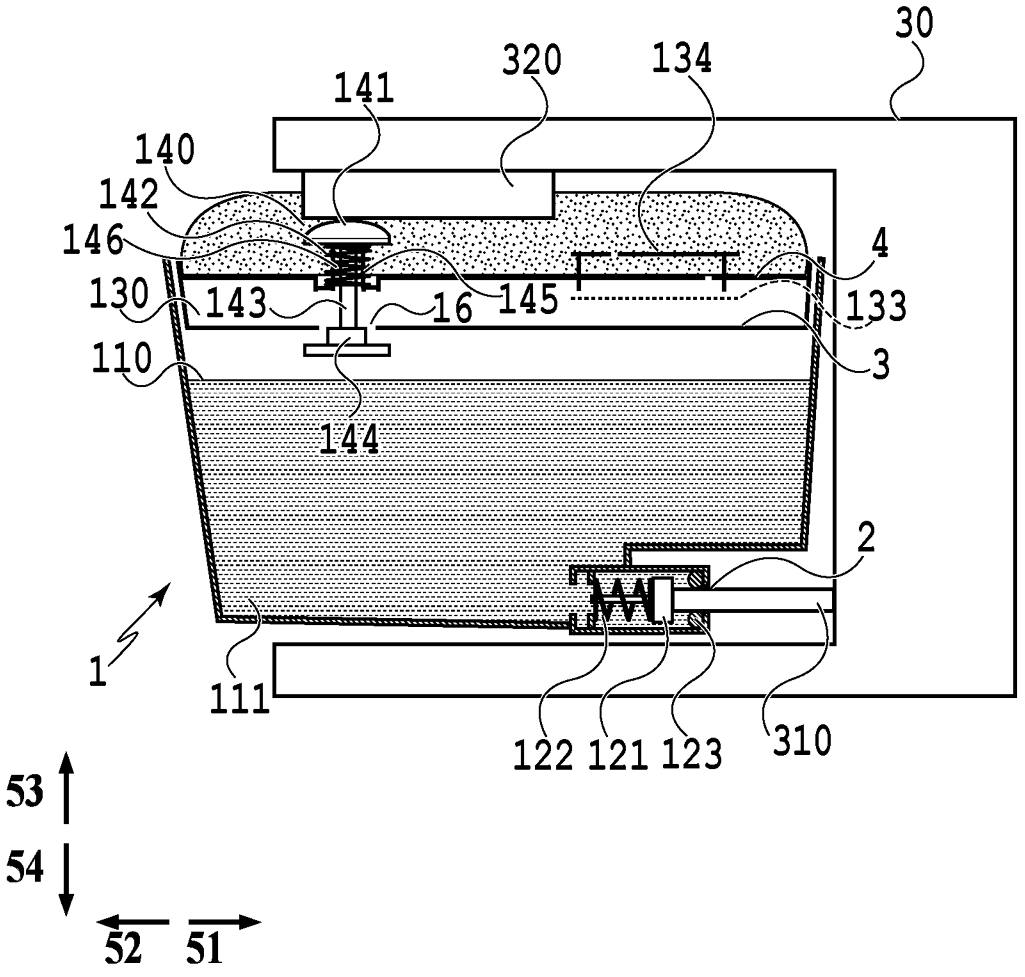
FIG. 11 is a cross-sectional diagram of the liquid cartridge upon completion of the mounting on the main body.

Next, the liquid supply unit 2 will be explained with reference to FIG. 9, FIG. 10, and FIG. 11. FIG. 10 is a diagram illustrating a process of mounting the liquid cartridge 1 on the holder 30 and is a cross-sectional diagram of the liquid cartridge illustrating the state immediately before the pressing unit 320 on the holder 30 side abuts on the first sealing rubber 141 of the valve unit 140. FIG. 11 is a cross-sectional diagram of the liquid cartridge illustrating the state where the mounting on the holder 30 is completed.

The liquid supply unit 2 is equipped with a valve which is configured with the valve element 121, the valve spring 122, and the annular-shaped joint seal 123. The valve element 121 is made of resin, the valve spring 122 is made of metal, and the joint seal 123 is made of rubber. The joint seal 123 is attached to an aperture for the liquid. In the state before being mounted on the main body, the valve element 121 is pressed against the joint seal 123 by the biasing force caused by the valve spring 122, so that the liquid supply unit 2 is kept closed. In the state of being mounted on the main body, the joint needle 310 on the main body side is inserted into the liquid supply unit 2 of the liquid cartridge 1. The joint needle 310 is configured as a terminal of the liquid supply system on the main body side, which has a hollow inside and is connected to the tube 20. This joint needle 310 is firstly slid and inserted while maintaining a sealed state with the joint seal 123, so as to press the valve element 121 against the biasing force caused by the valve spring 122. Thereafter, the valve element 121 moves in the direction away from the joint seal 123 (direction 52 in the drawings), so that the liquid supply unit 2 is opened and turned into a state where the liquid can be supplied to the liquid ejection head 100. In a case of being detached from the main body, a reversed operation of the above-described main body mounting process is performed.

<Atmosphere Communication Unit>

The atmosphere communication unit 130 will be explained with reference to FIG. 9. As described above, the atmosphere communication unit 130 is located above the liquid storage chamber 110. The atmosphere communication unit 130 is an atmosphere flow path formed with the first inner cover 3 (middle cover) and the second inner cover 4 (upper cover). In the atmosphere communication unit 130, the second inner cover 4 is equipped with the atmosphere communication film 134 having a function of communicating with the atmosphere. The first inner cover 3 has the atmosphere communication hole 16 formed to allow the atmosphere communication unit 130 and the liquid storage chamber 110 to communicate with each other. The gas-liquid separation membrane 133 is disposed inside this atmosphere communication unit 130. The gas-liquid separation membrane 133 is a semipermeable membrane that shuts off liquid communication and allows gas communication.

The valve unit 140 is arranged inside the atmosphere communication unit 130. The valve unit 140 has the first sealing rubber 141 (elastic member), the coil spring (biasing member) 142, the valve holder 143, and the second sealing rubber 144 (elastic member). The coil spring 142 is made of metal, and each of the sealing rubbers is made of rubber. Each of the first sealing rubber 141 and second sealing rubber 144 is assembled to the valve holder 143. The first sealing rubber 141 is assembled to the upper part of the valve holder 143, and the second sealing rubber 144 is assembled to the lower part of the valve holder 143. That is, the first sealing rubber 141 is disposed on the first direction side of the second inner cover 4 (upper cover), which is the direction opposite to the first inner cover 3 (middle cover). The second sealing rubber 144 is disposed on the storage chamber side of the first inner cover 3. The coil spring 142 is attached to the fixation holder 145, which is disposed on the second inner cover 4. The fixation holder 145 is disposed on the second inner cover 4 so as to extend upward (direction 53) from the second inner cover 4.

The valve holder 143 is inserted into the coil spring 142, which is assembled to the fixation holder 145, so as to be inserted to the atmosphere communication hole 16, which is formed in the first inner cover 3, and to the aperture 146, which is formed in the second inner cover 4 at a position facing the atmosphere communication hole 16. The first sealing rubber 141 is biased upward (direction 53) by the coil spring 142. A space is formed between the fixation holder 145 and the first sealing rubber 141. The outer diameter of the surface of the first sealing rubber 141 on the side to be assembled to the valve holder 143 is larger than the outer diameter of the fixation holder 145. Further, the first sealing rubber 141 has a curved surface.

The second sealing rubber 144 has a stepped structure with outer diameters of at least two steps. In the present example, the first step section having an outer diameter of the first size and the second step section having an outer diameter of the second size are included. It is also possible that the second step section has a tapered shape in which the outer diameter gradually decreases toward the first step section. The outer diameter of the first size is smaller than the atmosphere communication hole 16. The outer diameter of the second size is larger than the atmosphere communication hole 16. The valve unit 140 is attached so that the second step section of the second sealing rubber 144 is located below the first inner cover 3.

With the above-described configuration, the coil spring 142 is configured so that pressing in the direction 53 is exerted. That is, the coil spring 142 is biased in the direction 53 (first direction side), and the second sealing rubber 144 is in close contact with the atmosphere communication hole 16 due to the pressing by the coil spring 142, so as to seal the liquid storage chamber 110. More specifically, the second step section of the second sealing rubber 144 is located below the inner cover 135 (direction 54, second direction side) in which the atmosphere communication hole 131 is formed, and this second step section is in close contact with the atmosphere communication hole 16 so as to seal the liquid storage chamber 110.

By closing with such a configuration as described above, the second sealing rubber 144 seals the liquid storage chamber 110 from the inside. Therefore, even in a case where the internal pressure increases due to an environmental change during distribution, the second sealing rubber 144 is brought into closer contact with the atmosphere communication hole 16, so that the sealing of the tank at the time of not yet being mounted can be maintained.

<Mounting of the Liquid Cartridge>

Next, the atmosphere released state at the time of being mounted on the liquid cartridge will be explained with reference to FIG. 10, FIG. 11, FIG. 12, and FIG. 13.

As described above, in the state before the liquid cartridge 1 illustrated in FIG. 10 is mounted on the holder 30, the atmosphere communication hole 131 is sealed by the second sealing rubber 144, so that the liquid storage chamber 110 is maintained being in a sealed state. Distribution is carried out in this state.

From the state of FIG. 10, the liquid cartridge 1 is moved in the direction 51 and inserted into the holder 30 as illustrated in FIG. 11. The joint needle 310 of the holder 30 is arranged on the opposite side of the liquid supply unit 2 of the liquid cartridge 1 inserted in the direction 51. Further, the pressing unit 320 is arranged on the upper surface of the holder 30, and the pressing unit 320 is disposed at a position corresponding to the first sealing rubber 141.

Figure 12:
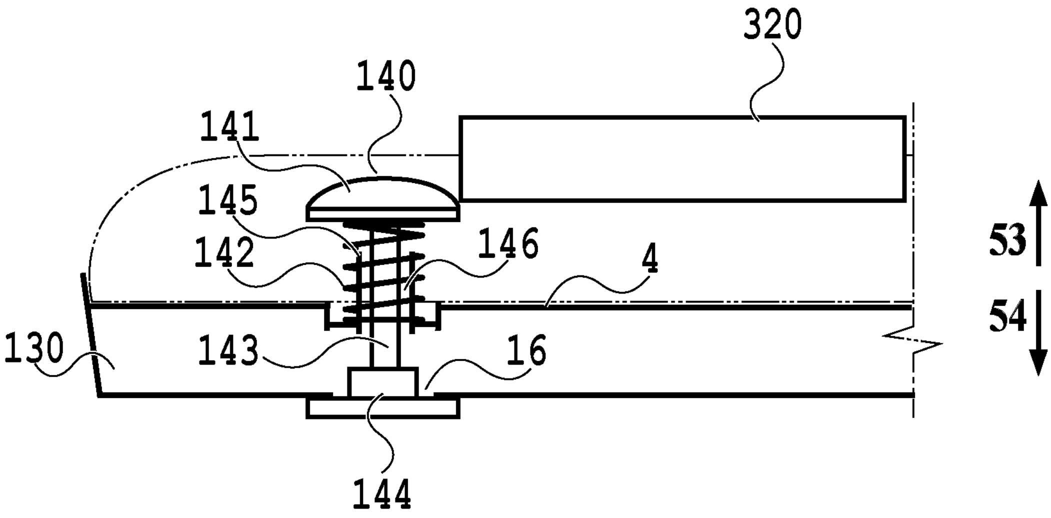
FIG. 12 is a diagram in which the periphery of the valve unit is enlarged.
Figure 13:
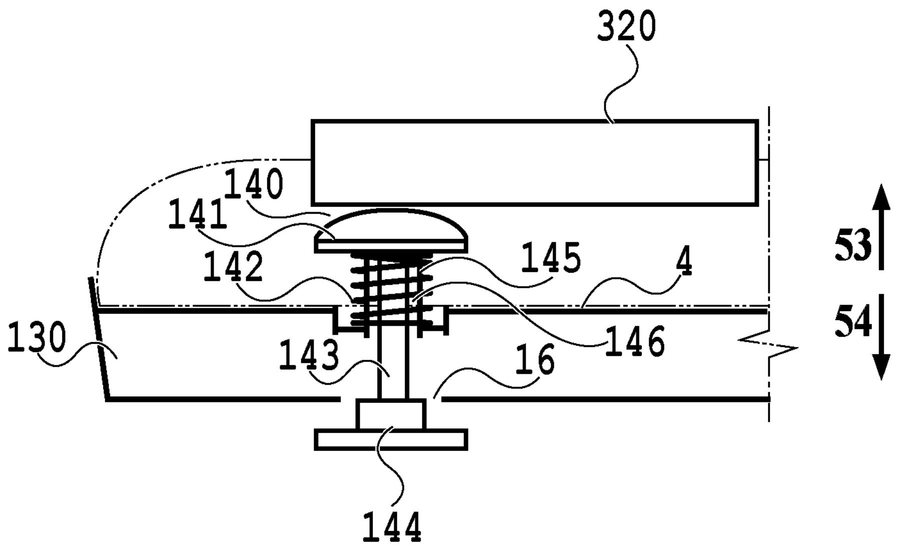
FIG. 13 is a diagram in which the periphery of the valve unit is enlarged.

In the process where the liquid cartridge 1 is inserted into the holder 30, as illustrated in FIG. 12, the pressing unit 320 and an end of the first sealing rubber 141 firstly abut on each other. As the insertion further proceeds, as illustrated in FIG. 13, the insertion proceeds so that the first sealing rubber 141 slips under the pressing unit 320. In the present embodiment, the first sealing rubber 141 has a shape with a curved surface, and the first sealing rubber 141 is configured to slip under the pressing unit 320 along the curved surface. The first sealing rubber 141 is configured with an elastic member and is deformed by contact with the pressing unit 320, so as to be slipped under the pressing unit 320. Therefore, it is not necessary that the first sealing rubber 141 has a shape with a curved surface.

FIG. 12 and FIG. 13 are diagrams in which the periphery of the valve unit is enlarged. In a case where the pressing unit 320 presses the first sealing rubber 141, the first sealing rubber 141 thereby seals the aperture portion in the upper part of the fixation holder 145 as illustrated in FIG. 13. Further, the valve holder 143 moves in the direction 54 in conjunction with the pressing against the first sealing rubber 141. By this movement of the valve holder 143, the second sealing rubber 144 moves in the direction (direction 54) toward the inside of the liquid storage chamber 110. If the second sealing rubber 144 is separated from the atmosphere communication hole 16 as described above, the atmosphere communication hole 16 is opened, so that the liquid storage chamber 110 is opened to the atmosphere.

After this liquid storage chamber 110 starts communicating with the outside air, if the insertion of the joint needle 310 into the liquid supply unit 2 is completed, the liquid cartridge 1 is in the state where the mounting onto the valve holder 143 is completed as illustrated in FIG. 11. If the liquid in the liquid storage chamber 110 is consumed, the external air enters the atmosphere communication unit 130 through the atmosphere communication film 134 and comes into the liquid storage chamber 110 through the atmosphere communication hole 16.

Next, an explanation will be given of the case in which the liquid cartridge 1 mounted on the holder 30 is detached. In the case where the liquid cartridge 1 is detached from the holder 30, the reversed motion of the above-described mounting process is performed. That is, in the process of detaching the liquid cartridge 1, the pressing by the pressing unit 320 is released. Then, the valve unit 140 moves upward (direction 53) due to the biasing force caused by the coil spring 142. Further, the atmosphere communication hole 16 is sealed by the second sealing rubber 144 again due to the biasing force caused by the coil spring 142.

As explained above, in the present embodiment, the atmosphere communication hole 16 is sealed from the liquid storage chamber 110 side. Therefore, even at the time where the internal pressure increases during distribution, a force acts in the sealing direction, so that the sealed state can be maintained. Further, even in a case where the liquid cartridge 1 is detached from the holder 30, the atmosphere communication hole 16 can be sealed again from the liquid storage chamber 110 side.

Moreover, in the present embodiment, in the state where the liquid cartridge 1 is mounted, the first sealing rubber 141 is moved due to the pressing by the pressing unit 320 of the holder 30, so that the aperture portion in the upper part of the fixation holder 145 is sealed. Therefore, the reliability against liquid leakage can be improved as compared, for example, to the comparative example with the configuration in which the second inner cover 4 is sealed only by the biasing force caused by the coil spring 530 as illustrated in FIG. 6. Therefore, the reliability against liquid leakage can be improved in both of the time where the tank has not been mounted yet, such as the time of distribution or the time where the user checks the remaining amount, and the time where the tank is mounted, such as the time of being used by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-089605, filed May 22, 2020, which is hereby incorporated by reference wherein in its entirety.

What is claimed is:

1. A liquid cartridge comprising:

a storage chamber configured to store liquid;

a liquid supply unit configured to supply the liquid stored in the storage chamber to an outside;

a first partition configured to section an inside of the storage chamber from an atmosphere;

an atmosphere communication hole disposed in the first partition and configured to allow the inside of the storage chamber to communicate with the atmosphere;

a valve unit configured to be movable to a position to close the atmosphere communication hole and a position to open the atmosphere communication hole; and a lever configured to fix the valve unit to the position to close the atmosphere communication hole by pressing the valve unit and configured to be capable of moving the valve unit to the position to open the atmosphere communication hole by removing the pressing against the valve unit, wherein the lever is configured to remove the pressing against the valve unit by moving in a direction intersecting a direction in which the valve unit moves, wherein the lever includes a pressing unit configured to press the valve unit and a supporting unit configured to support the pressing unit, wherein the liquid cartridge further comprises a second partition disposed on an opposite side of the storage chamber in relation to the first partition, wherein the second partition is configured to hold the supporting unit, wherein an assembling hole is formed in the second partition, and wherein the supporting unit is inserted into the assembling hole.

2. The liquid cartridge according to claim 1, wherein the supporting unit is configured to be supported by the second partition at one point.

3. The liquid cartridge according to claim 1, wherein the supporting unit is configured to be assembled to the second partition in a snap-fit system.

4. The liquid cartridge according to claim 1, wherein the supporting unit is configured to be disposed at an end of the pressing unit.

5. The liquid cartridge according to claim 1, wherein the second partition is configured with an aperture for communicating with the atmosphere and an aperture formed at a position facing the atmosphere communication hole of the first partition so as to pass the valve unit.

6. The liquid cartridge according to claim 1, wherein the valve unit includes a biasing member disposed between the second partition and the lever and configured to bias the valve unit in a direction to open the atmosphere communication hole.

7. The liquid cartridge according to claim 1, wherein the pressing unit is configured to pivotally move about the supporting unit by externally receiving an action for moving from a first position in which the valve unit is pressed to a second position in which the pressing is removed.

8. The liquid cartridge according to claim 7, wherein the supporting unit is configured to be disposed on a downstream side relative to the pressing unit in a direction of the externally received action.

9. The liquid cartridge according to claim 7, wherein the supporting unit is configured to be disposed on an upstream side relative to the pressing unit in a direction of the externally received action.

10. The liquid cartridge according to claim 7, wherein the pressing unit is configured with a cut-off portion, so that, in a case where the valve unit moves to an inside of the cut-off portion as a result of the pivotal movement, the valve unit thereby moves to the position to open the atmosphere communication hole.

11. A liquid ejection apparatus comprising a guide member configured to act on a lever in a case where a liquid cartridge is attached, the liquid cartridge including a storage chamber configured to store liquid, a liquid supply unit configured to supply the liquid stored in the storage chamber to an outside, a first partition configured to section an inside of the storage chamber from an atmosphere, an atmosphere communication hole disposed in the first partition and configured to allow the inside of the storage chamber to communicate with the atmosphere, a valve unit configured to be movable to a position to close the atmosphere communication hole and a position to open the atmosphere communication hole, and the lever configured to fix the valve unit to the position to close the atmosphere communication hole by pressing the valve unit and configured to be capable of moving the valve unit to the position to open the atmosphere communication hole by removing the pressing against the valve unit, wherein the lever is configured to remove the pressing against the valve unit by moving in a direction intersecting a direction in which the valve unit moves, wherein the lever includes a pressing unit configured to press the valve unit and a supporting unit configured to support the pressing unit, wherein the liquid cartridge further comprises a second partition disposed on an opposite side of the storage chamber in relation to the first partition, wherein the second partition is configured to hold the supporting unit, wherein an assembling hole is formed in the second partition, wherein the supporting unit is inserted into the assembling hole.

12. A liquid cartridge configured to be detachably attachable to a liquid ejection apparatus, the liquid cartridge comprising:

a storage chamber configured to store liquid;

a liquid supply unit configured to supply the liquid stored in the storage chamber to an outside;

a first partition configured to section an inside of the storage chamber from an atmosphere flow path;

a second partition configured to configure the atmosphere flow path together with the first partition;

an atmosphere communication hole disposed in the first partition and configured to allow the inside of the storage chamber to communicate with the atmosphere; and a valve unit configured to be capable of moving to a position to close the atmosphere communication hole and a position to open the atmosphere communication hole, wherein the valve unit is configured with a first elastic member disposed on a first direction side of the second partition, which corresponds to a direction opposite to the first partition, a second elastic member disposed on the storage chamber side of the first partition, and a biasing member configured to bias the first elastic member toward the first direction side, wherein, in a case where the second elastic member of the valve unit makes close contact with the atmosphere communication hole, the atmosphere communication hole is configured to be thereby closed, and wherein, in a case where the second elastic member of the valve unit moves to a position inside the storage chamber, the atmosphere communication hole is configured to be thereby opened, wherein the valve unit is configured with a valve holder to which the first elastic member and the second elastic member are assembled, and wherein the second partition is configured to be equipped with a fixation holder for holding the biasing member, the fixation holder is configured with an aperture portion for communicating with the atmosphere, and the valve holder is configured to be inserted to the aperture portion.

* * * * *